United States Patent [19]

Marchenko et al.

[11] 4,017,354

[45] Apr. 12, 1977

[54] ROTARY FILM EVAPORATING APPARATUS

[76] Inventors: Alexandr Nikolaevich Marchenko, Kolodezny pereulok, 47, kv. 2; Anatoly Borisovich Tjutjunnikov, ulitsa Frunze, 17, kv. 34, both of Kharkov, U.S.S.R.

[22] Filed: May 4, 1976

[21] Appl. No.: 683,228

[52] U.S. Cl. .............................. 159/6 R; 210/378; 233/47 R

[51] Int. Cl.² .......................................... B01D 1/22

[58] Field of Search .......... 159/6 R, 7, 11 A, 13 A; 202/236; 210/378; 34/58; 261/85; 233/27, 47 R

[56] References Cited

UNITED STATES PATENTS

| | | | |
|---|---|---|---|
| 3,004,901 | 10/1961 | Nergi | 159/6 R |
| 3,282,797 | 11/1966 | Hammer | 202/236 |
| 3,397,730 | 8/1968 | Fritz | 159/13 A |
| 3,472,304 | 10/1969 | Evkin | 159/6 R |
| 3,547,593 | 12/1970 | Olevsky | 159/6 R |
| 3,568,766 | 3/1971 | Thomas | 202/236 |
| 3,957,588 | 5/1976 | Humiston | 159/6 R |

*Primary Examiner*—Hiram H. Bernstein

[57] ABSTRACT

The rotary film evaporating apparatus comprises a vertical cylindrical housing with a heated side wall, subdivided vertically into a plurality of communicating sections. A shaft extends through the housing, carrying thereon a hollow spraying drum within each one of the sections. The side wall of the spraying drum is formed by longitudinal bars, S-shaped in cross-section, the bars being so arranged that the longitudinal lateral edges of the bars extend into the indented portions of the adjacent bars, thereby forming a labyrinth-like passage for vapor. The portions of the bars, which are the most remote from the shaft, have apertures made therethrough for passage of the liquid.

1 Claim, 5 Drawing Figures

ROTARY FILM EVAPORATING APPARATUS

The invention relates to chemical engineering, and more particularly it relates to rotary film evaporating apparatus employed in the chemical and allied industries for concentration and distillation of heat-sensitive organic products, as well as for carrying out chemical reactions.

The disclosed apparatus can be used, for example, in the production of semi-finished products for plastics, synthetic substitutes for fats, plant protection chemicals, as well as in microbiology, vitamin production, food and pharmaceutical industries.

Known in the art are rotary film evaporating apparatus wherein a thin film of a liquid to be evaporated is created on a heat transfer surface with aid of centrifugal spraying devices mounted on a central shaft.

One of the evaporating apparatus of the prior art includes a vertical housing subdivided into sections, with a side wall heated by heating jackets and a centrally extending rotatable shaft. Conical projections extending into the interior of the housing intermediate of the sections act as the means for collecting the evaporating product flowing down along the housing wall of the upper section and directing it into the lower section. Spraying means in the form of discs with apertures for passage of vapor are mounted on the central shaft directly above the said conical projections. Above the uppermost one of these discs there is mounted a device for feeding a product to be evaporated onto this disc. The upper portion of the housing is of an increased width and serves as a separator for cleaning the vapor formed within the evaporating apparatus from liquid droplets. This increased-diameter upper portion of the housing is provided with means for withdrawing the vapor from the evaporator, while the bottommost part of the housing is provided with a concentrate withdrawal means.

This evaporating apparatus of the prior art operates, as follows. The product to be evaporated is fed onto the topmost spraying disc, and centrifugal forces throw this product upon the internal surface of the heated side wall of the respective section of the housing, in which way a flowing-down film of the liquid is formed, the liquid in this film actively evaporating, particularly, in the areas acted upon by the impinging jets of the liquid. This liquid flowing down the wall of the respective section eventually flows onto the surface of the conical projections wherefrom it is directed onto the underlying spraying disc, and the abovedescribed process repeats itself.

The vapor thus formed is cleaned from liquid droplets in the increased-diameter upper portion of the housing and is withdrawn from the evaporating apparatus, while the descending flow of the concentrate is withdrawn from the bottom part of the housing.

However, in this evaporating apparatus of the prior art each spraying device sprinkles the liquid onto a relatively narrow strip of the internal surface of each section, the rest of this surface being moistened with the freely flowing film of the liquid, which affects the productivity of the evaporating apparatus. Furthermore, the separating device incorporated for cleaning the vapor from droplets of the evaporating liquid has to have certain dimensions which, within a given size of the evaporating apparatus, reduce the useful height of the housing. Besides, the droplets of the product carried by the vapor from the lower sections into the upper part blend with the initial product, following the separation, which considerably increases the time of residence of the product within the area of elevated temperatures, and, hence, increases the waste of the product, caused by its thermal decomposition.

The intensity of the operation of the evaporating apparatus can be stepped up by the liquid to be evaporated being sprinkled over the entire heat transfer area of the sections of the evaporator, whereby this entire area becomes permanently acted upon by jets of the liquid.

This is attained in the design of other rotary film evaporating apparatus of the prior art wherein the spraying devices are in the form of hollow drums mounted on the shaft. The side wall of the spraying drum is corrugated, with apertures made through the crests and valleys of the corrugations serving, respectively, for spraying the liquid and for passage of vapor into the drum. The liquid fed into the drum flows down along the vertical triangular passages defined by the corrugations and is thrown outwardly through the apertures upon the heated walls of the sections of the housing.

The apertures for spraying the liquid are arranged along a helical line, which ensures uniform moistening of the entire surface of heat transfer.

However, the last-described design of a film evaporating apparatus, like the previously described one, would not eliminate a deficiency caused by re-blending of the liquid to be evaporated and necessitates the incorporation of a separating device.

It is an object of the present invention to provide a rotary film evaporating apparatus, wherein the separation of the vapor from droplets of the liquid being evaporated should be effected directly within the spraying drum, without the use of a separate separating device.

It is another object of the present invention to provide a rotary film evaporating apparatus wherein re-blending of the liquid should be virtually eliminated.

These and other objects are accomplished in a rotary film evaporating apparatus comprising a vertical cylindrical housing with a side wall heatable by heating jackets and a centrally extending shaft, the housing being vertically subdivided into a plurality of intercommunicating sections, each such section accommodating therein a hollow spraying drum mounted concentrically on the shaft, the housing being provided with means for suppying a liquid product to be evaporated into the upper portion of the housing, with means for withdrawing a concentrate from the bottom part of the housing, with means intermediate of each pair of adjacent sections for collecting the evaporating liquid flowing down the wall of the upper one of this pair of sections and directing this liquid into the spraying drum of the lower one of this pair of sections, and with means for withdrawing the vapor from the internal space of the housing, in which apparatus, in accordance with the present invention, the side wall of each spraying drum is formed by a plurality of individual longitudinal bars which are S-shaped in cross sections and so arranged that the outer longitudinal edges of these bars extend into the indented portions of the adjacent bars, defining therewith labyrinth-like passages for the vapor, the portions of the bars, which are the most remote from the shaft, having apertures made therethrough for passage of the liquid.

In the herein disclosed rotary film evaporating apparatus the spraying drum ensures both moistening of the entire heat transfer surface and separation of the vapor from droplets of the liquid. This is effected by ensuring a varying direction of the motion of the vapor within the labyrinth-like passage, as the vapor finds its way from the surface where evaporation takes place to the centre of the drum. The droplets of the liquid carried by this vapor settle on the external surface of the spraying drum and are thrown back onto the heat transfer surface practically onto the very spot from which they had been carried away. Consequently, re-blending of the liquid is substantially reduced, and the time of residence of the liquid in the evaporator is reduced to less than one half of that characteristic of the evaporating apparatus of the prior art which have separate separating devices, and this feature considerably improves the quality of the product.

In an evaporating apparatus of the prior art the separating device more often than not takes about 30 percent of the useful height. The elimination of the separating device in the herein disclosed evaporating apparatus has enabled to step up the productivity of the evaporating apparatus by approximately 20% with the same overall dimensions, the amount of metal in the structure of the apparatus being at the same time reduced by 15%.

The invention will be further described in connection with embodiments thereof, with reference being had to the accompanying drawings, wherein.

Figure 1:
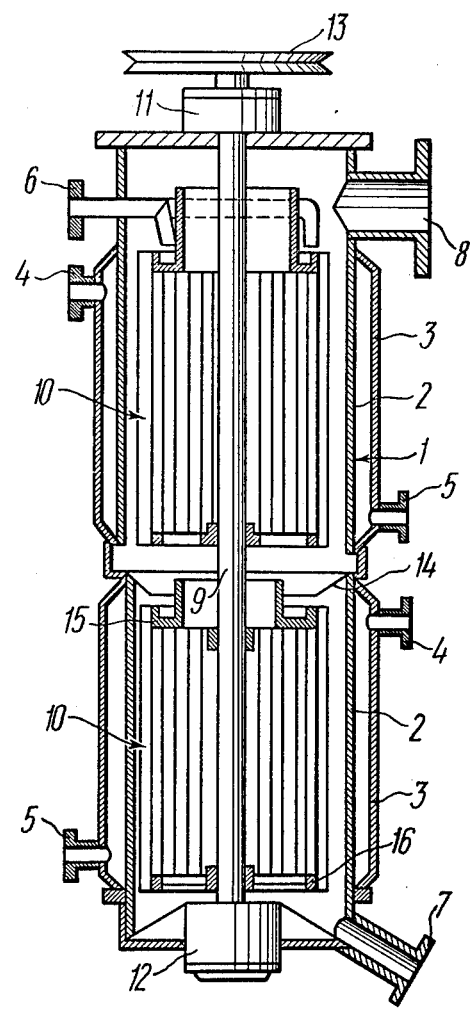
FIG. 1 is a schematic longitudinally sectional view of a rotary film evaporating apparatus embodying the invention.

In the drawings, the rotary film evaporating apparatus comprises a vertical cylindrical housing 1 (FIG. 1) subdivided vertically into a plurality of intercommunicating sections 2. The side wall of the housing 1 is heatable by heating jackets 3. The jackets 3 are provided with connections 4 for supplyin heating steam thereinto, as well as with connections 5 for withdrawing a condensate therefrom. The evaporating apparatus is provided with a device for supplying a liquid product to be evaporated into the upper part of the housing 1, including an inlet connection 6, as well as with a device for withdrawing a concentrate from the bottom part of the housing 1, including an outlet connection 7, and a device for withdrawing the vapor from the interior of the housing 1, including a vapor outlet connection 8.

A shaft 9 extends centrally of the housing 1 and carry thereon hollow spraying drums 10. The shaft 9 is journalled for rotation in bearings 11 and 12 and has a driven pulley 13 for connection to a drive means.

Intermediate of the pairs of the adjacent sections 2 of the housing 1 there are provided means for collecting the evaporating product flowing down the wall of the housing 1 within the upper one of this pair of sections and for directing it into the spraying drum 10 of the lower one of this pair of sections 2, the means including guiding projections 14 shaped as truncated cones. Alternatively, this means may be in the form of troughs (not shown) or any other suitable guiding means.

Figure 2:
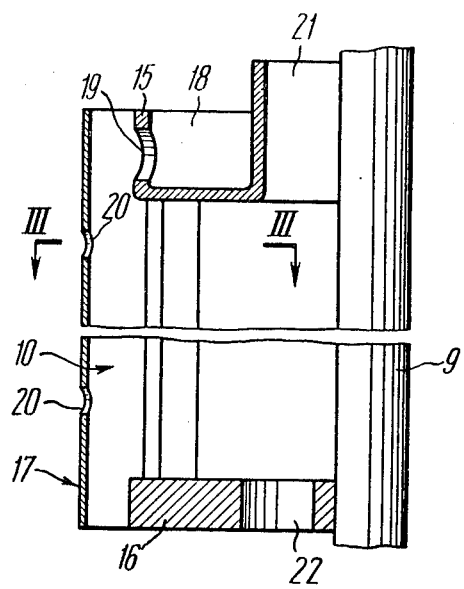
FIG. 2 is an enlarged cross-sectional fragmentary view of the spraying drum according to the invention.

Each spraying drum 10 has a top disc 15 and a bottom disc 16, its side wall being made up of individual longitudinal bars 17 (FIGS. 2 and 3) secured to these discs 15 and 16 and being generally S-shaped in cross-section.

The top disc 15 has made therein a cup-like cavity 18 (FIG. 2) which collects the liquid flowing from the guiding projection 14 (FIG. 1) overlying this drum 10.

The liquid flows from this cavity 18 (FIG. 2) into the interior of the spraying drum 10 through perforations 19 displaced in opposition to the respective bars 17.

The portions of the bars 17, which are the most remote from the shaft 9, have apertures 20 made therethrough for passage of the liquid.

To afford passage for the vapor rising in the evaporating apparatus, the top disc 15 has made therethrough an opening 21, and the bottom disc 16 — a similar opening 22.

The bars 17 are so arranged that their longitudinal outer edges 23 and 24 (FIG. 3) extend into the indented portions or valleys of the adjacent bars 17, defining labyrinth-like passages 25 for the vapor.

Figure 3:
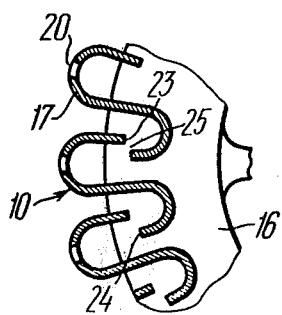
FIG. 3 is a sectional view taken along line III—III of FIG. 2.
Figure 5:
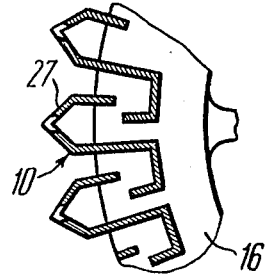
FIGS. 4 and 5 are cross-sectional views of modifications of the bars making up the spraying drum according to the invention.
Figure 4:
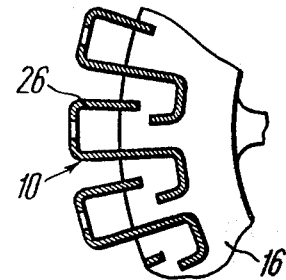

The generally S-shaped profile of the bars 17 may have its successive portions either smoothly conjugating, as is shown in FIG. 3, or made up by straight flats, as is the case with a modification 26 (FIG. 4) of the profile of the bars, or else in another modification 27 (FIG. 5) of the bar the profile may have an acute angle at its crest remote from the shaft.

The profile of the bars 17 (FIG. 3) presents smaller resistance to the flow of the vapor, as compared with the profile of the bars 26 (FIG. 4); however, the latter introduces sharp changes into the direction of the motion of the vapor and, consequently, ensures better separation. The profile of the bars 27 (FIG. 5) offers better conditions for the flow of the liquid along the bars 27.

The herein disclosed rotary film evaporating apparatus operates, as follows.

The liquid to be evaporated is fed via the inlet connection 6 (FIG. 1) into the uppermost spraying drum 10 which rotates jointly with the shaft 9 journalled in the bearings 11 and 12. The liquid product is directed into the cup-like cavity 18 (FIG. 2) in the top disc 15 of the drum 10, and the centrifugal forces drive it through the perforations 19 against the internal surface of the bars 17. While flowing down under gravity forces, the liquid reaches the apertures 20 through which it is forced outwardly in jets. These jets of the liquid impinge upon the internal side wall of the housing 1 (FIG. 1) heated by the heat carrier fed into the heating jackets 3, whereby the liquid actively evaporates, the impingement of the liquid jets substantially intensifying this process of evaporation. The liquid that has not evaporated flows down the internal surface of each section 2 and is directed by the respective guiding projection 14 into the spraying drum of the underlying section 2, whereafter the abovedescribed process repeats itself. The concentrate flows down into the bottom part of the housing 1 and leaves through the outlet connection 7.

The vapor produced in the process of evaporation and carrying droplets of the liquid passes through the labyrinth-like passages 25 (FIG. 3), the sharp changes in the direction of the flow of the vapor resulting in these droplets settling on the external surface of the bars 17 and being thrown by the centrifugal forces back, practically upon the same spot where they had been formed. This feature is a significant asset, since it virtually eliminates re-blending of the liquid in the evaporating apparatus.

The vapor separated from the droplets of the liquid in the labyrinth passage 25 flows into the internal space of the spraying drum 10 and, after having passed through the openings 22 and 21 (FIG. 2) in the discs 16 and 15, finds its way into the topmost part of the housing 1, wherefrom it is withdrawn via the outlet connection 8.

We claim:

1. A rotary film evaporating apparatus comprising: a vertical cylindrical housing subdivided vertically into a plurality of intercommunicating sections; a heating jacket on the side wall of said housing at each said section; a central shaft mounted for rotation within said housing; hollow spraying drums concentrically mounted on said shaft in each one of said sections; longitudinal bars defining the side wall of each said spraying drum, said bars being generally S-shaped in cross-section and arranged so that the longitudinal outer edges of said bars extend into the indented portions of the adjacent ones of said bars, defining therewith labyrinth-like passsages for a vapor; the portions of said bars which are the most remote from said shaft having apertures made therethrough for passage of a liquid; means for supplying a liquid product to be evaporated into the topmost portion of said housing; means for withdrawing a concentrate from the bottom part of said housing; means for withdrawing the vapor from the internal space of said housing; means for collecting the evaporating liquid flowing down the wall of said housing within an upper one of said sections and for directing it into said spraying drum of the underlying one of said sections, said last-mentioned means being located intermediate the adjacent pairs of said sections.

* * * * *